May 19, 1942.  A. W. GUSTAFSON  2,283,805
DUSTING MACHINE
Filed Feb. 7, 1939  3 Sheets-Sheet 2
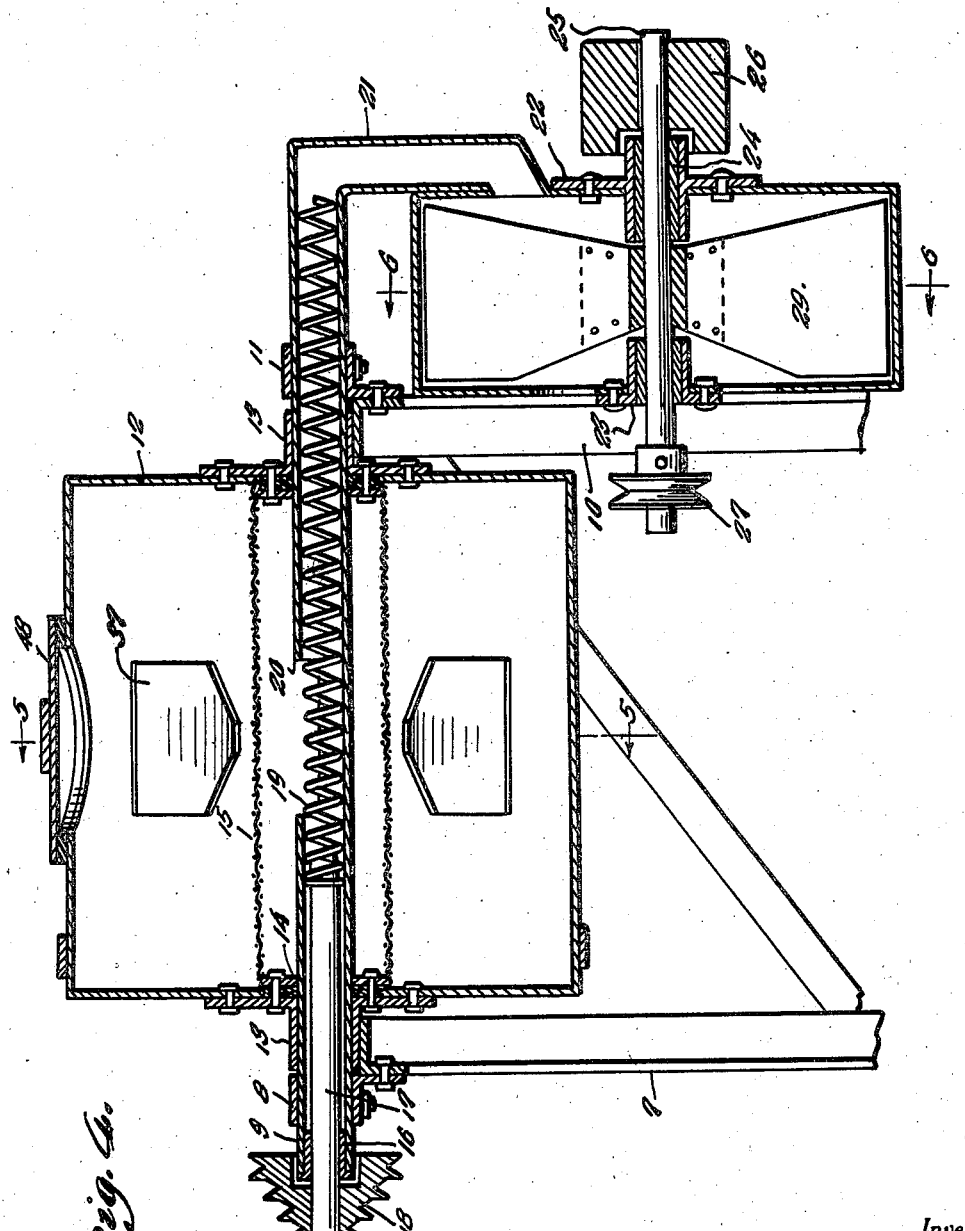
Inventor
A. W. Gustafson
By Clarence A. O'Brien
and Hyman Berman
Attorneys

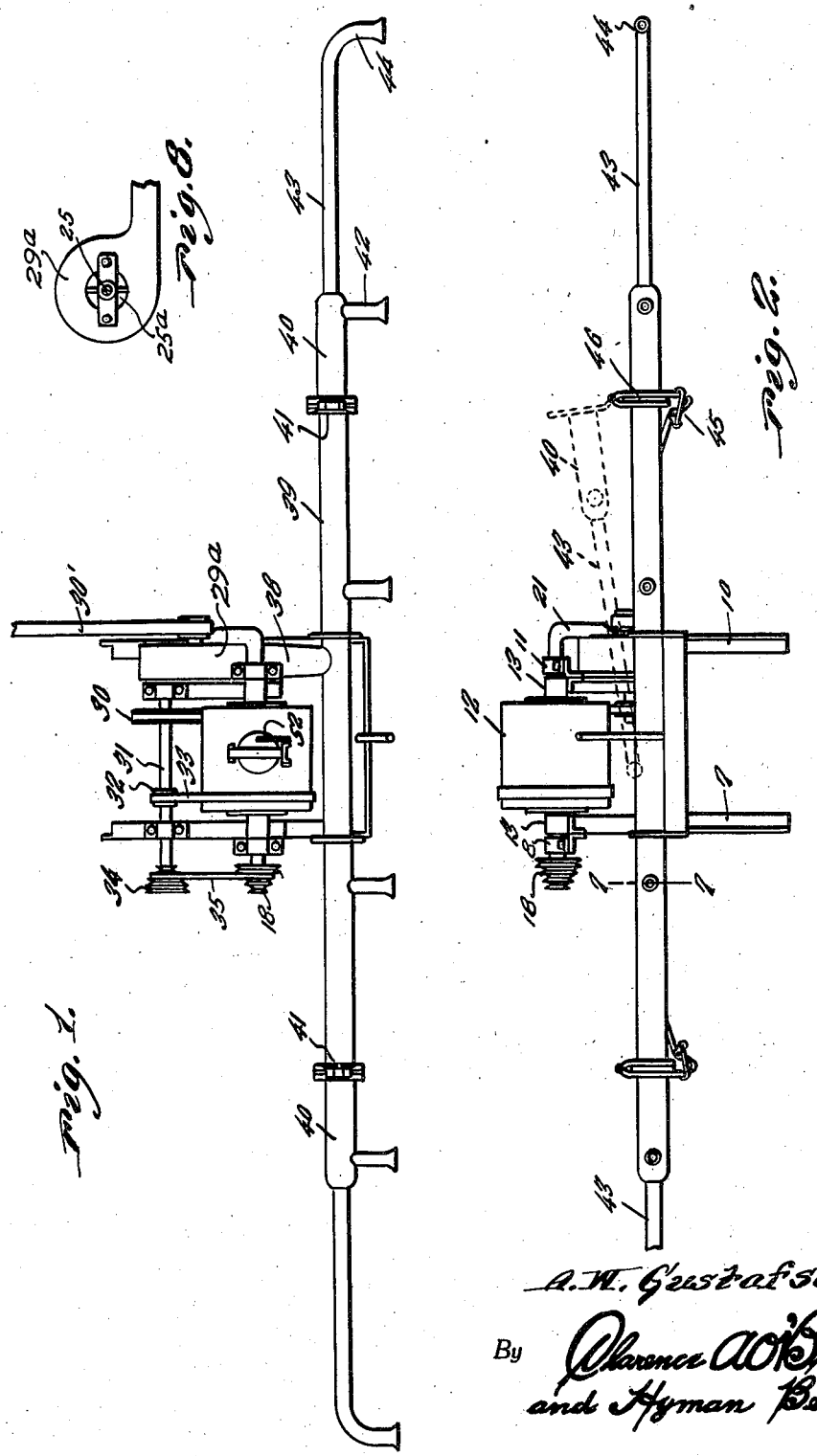

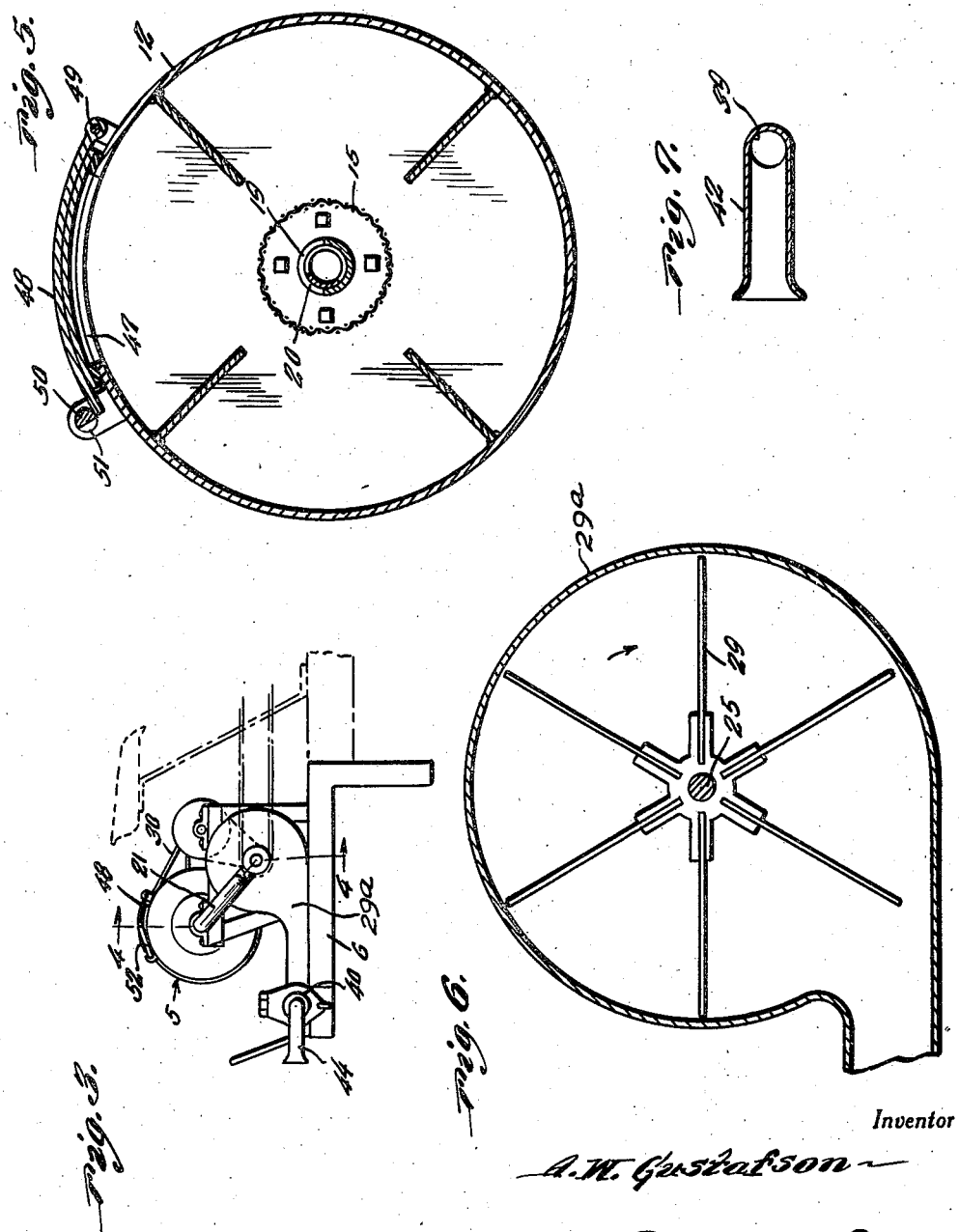

Patented May 19, 1942

2,283,805

UNITED STATES PATENT OFFICE 2,283,805

DUSTING MACHINE

August W. Gustafson, Hutto, Tex.

Application February 7, 1939, Serial No. 255,127

1 Claim. (Cl. 221—123)

This invention appertains to new and useful improvements in machines especially adapted for dusting growing crops with chemicals for the purpose of eradicating various types of parasites.

The principal object of the present invention is to provide a dusting machine of the character stated wherein the chemicals are kept thoroughly mixed and in a pulverized state.

Another important object of the invention is to provide a dusting machine wherein means is provided for executing an application of the chemicals over a wide range of the crops being treated.

These and other objects and advantages of the invention will become apparent to the reader of the following specification.

In the drawings—

Figure 1 represents a top plan view of the apparatus.

Figure 2 is a rear elevational view.

Figure 3 is a side elevational view.

Figure 4 is a section on the line 4—4 of Figure 3.

Figure 5 is a section on the line 5—5 of Figure 4.

Figure 6 is a section on the line 6—6 of Figure 4.

Figure 7 is a sectional view on the line 7—7 of Figure 2.

Figure 8 is a fragmentary side elevational view of the blower.

Referring to the drawings wherein like numerals designate like parts, it can be seen that the apparatus is generally referred to by the numeral 5 in Figure 3 and consists of the base frame 6 attached in a suitable manner to an agricultural machine (shown in broken lines in Figure 3).

Rising from the frame 6 is the upright 7, the upper portion of which carries a clamp collar 8 for embracing one end of the elongated barrel 9. A second upright 10 carries the collar 11 at its upper end for embracing the opposite end portion of the barrel 9.

Numeral 12 represents the chemical containing drum, the end walls of which are provided with tubular extensions 13 forming bearings circumscribing the end portions of the barrel 9.

Clamp rings 14 on the inner side of the end walls of the drum 12 clamp the end portions of the cylindrical screen 15 against the inner sides of the end walls of the drum 12 to support the screen in the cylindrical form shown in Figure 4.

In one end of the barrel 9 is the bearing assembly 16 through which extends the shaft 17, the shaft at its outer end carrying the multiple pulley 18 while attached to the inner end of the barrel is the elongated coil 19 serving as a feed screw for the chemicals falling into the barrel 9 through the opening 20 therein.

The coil 19 extends to the distal end of the barrel 9 and at this point the barrel 9 extends downwardly as at 21 and attaches to the fan housing 22. The barrel 9 communicates with the interior of the housing 22 which is provided with openings in the side walls thereof through which a flanged tubing 23 extends, the latter serving as carriers for the bearings 24 through which the shaft 25 extends. One end of the shaft 25 carries the pulley 26 while the opposite end carries the pulley 27. The fan blades 29 radiate from the shaft 25 in the housing 29a for the fan, and the belt 30 extending from the tractor or other machine (shown in broken lines in Figure 3) guides the pulley 26 and shaft 25 while the pulley 27 by way of the belt 30 drives the counter shaft 31 on which is the pulley 32. The belt 33 extends from over the pulley 32 and is trained over the drum 12, so that the drum 12 is driven from the shaft 31. The fan housing 29a has an axially located air opening 25a.

Furthermore, a variable or multiple pulley 34 is provided on the end of the shaft 31 adjacent the multiple pulley 18 and a belt 35 is trained over these multiple pulleys 18, the belt being adjustable on these pulleys to vary the drive for the feed coil 19. Extending inwardly from the drum 12 are the blades 37, the blades rotating with the drum to keep the material well pulverized.

Numeral 38 represents the spout from the blower and this communicates with the manifold pipe 39 which at its end is provided with extending sections 40 hingedly secured thereto as at 41. From the sections 40 and to the section 39 extend the chemical spreading nozzles 42 in a rearward direction. Reduced tubes 43 extend from the sections 40 and terminate in laterally curved chemical spreading nozzles 44.

A suitable eccentric catch 45 can be provided between each of the sections 40 and the corresponding end of the tube 39 and a suitable gasket 46 can be provided in each of these joints.

The drum 12 has an opening 47 therein over which is swingable the closure 48. The closure 48 is hingedly secured as at 49 to the drum 12 and its free end is held by the rotary shaft 50 which has a reduced portion 51 which when located over the edge of the closure 48 frees the closure so that it can be swung to an open position. The shaft 50 is provided with an operating arm 52.

It can now be seen that the chemicals are placed in the drum 12 and the drum is rotated on the barrel 9 by the belt 33. This results in the agitating of the contents of the drum and the sifting of the same through the screen 15 into the barrel 9 where the screw 19 carries the same into the blower unit from where it is discharged by way of the spout 38 by way of the manifold 39 and its extensions 40—40.

Whenever it is desired to reduce the length of the manifold assembly, the end sections 40—40 can be swung inwardly to the dotted line position shown in Figure 2 by releasing the fasteners 45.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

In a machine of the character described, a drum having end walls, said end walls having openings therein, a barrel extending through the drum and the openings of the end walls, said barrel having an opening therein at the inside of the drum, feed means in the barrel, clamp rings circumscribing the barrel at the inner sides of the end walls, a cylindrical screen spacially disposed around the barrel at the inside of the drum and having its end portions turned inwardly and disposed between the end walls and the clamp rings, and securing means for the clamp rings.

AUGUST W. GUSTAFSON.